Jan. 1, 1957        A. W. HAAS        2,776,046
CHAIN TENSIONING DEVICE FOR CONVEYOR DISHWASHING MACHINES
Filed Nov. 24, 1954        2 Sheets-Sheet 1
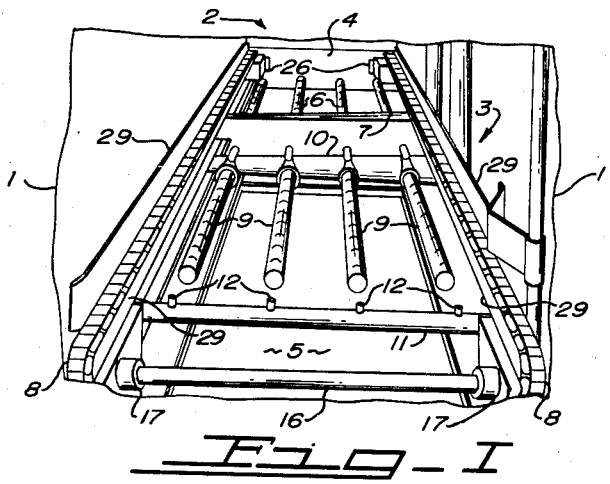
Fig. I
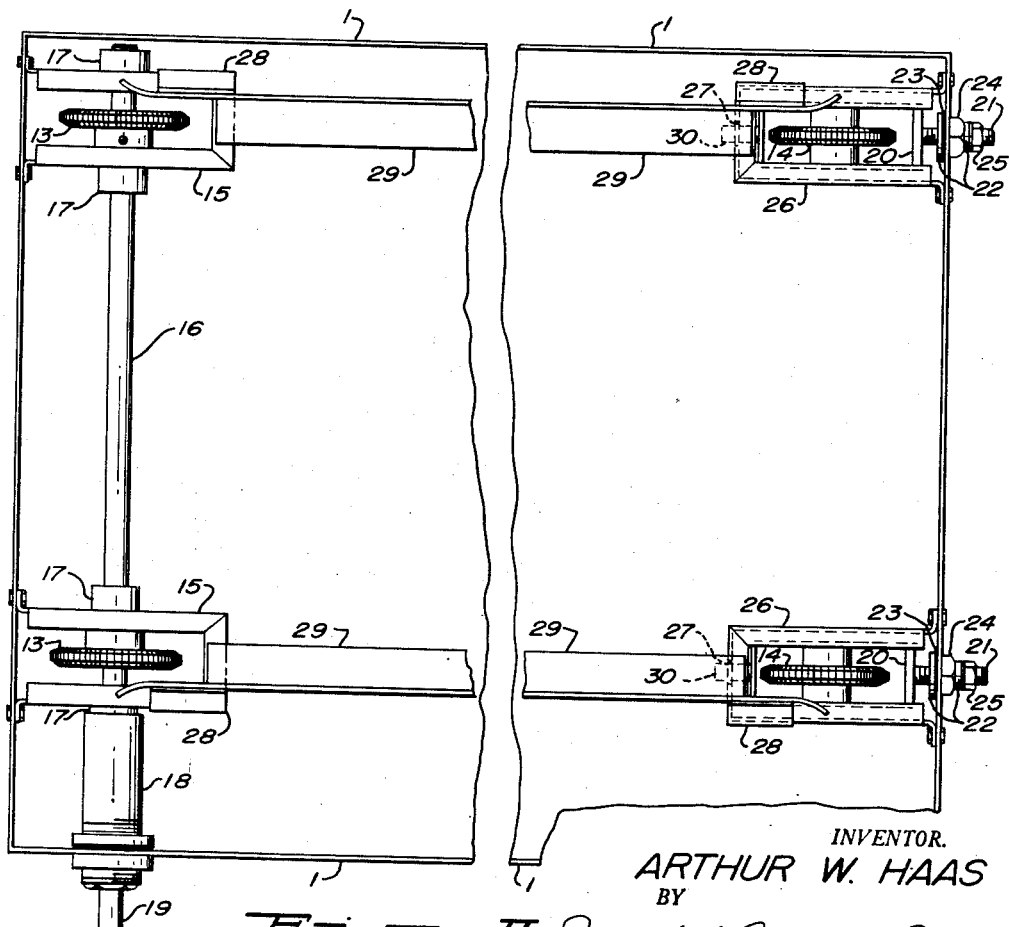
Fig. II
INVENTOR.
ARTHUR W. HAAS
BY
Marshall, Marshall & Pasting
ATTORNEYS Jan. 1, 1957 A. W. HAAS 2,776,046
CHAIN TENSIONING DEVICE FOR CONVEYOR DISHWASHING MACHINES
Filed Nov. 24, 1954 2 Sheets-Sheet 2
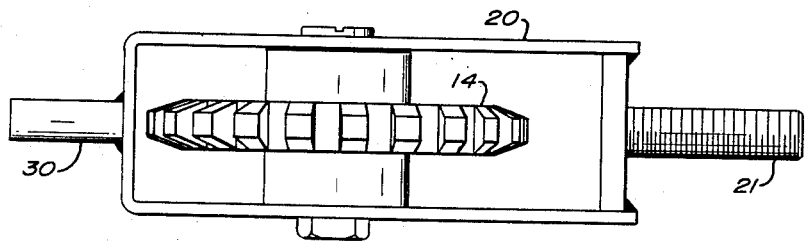
Fig. III
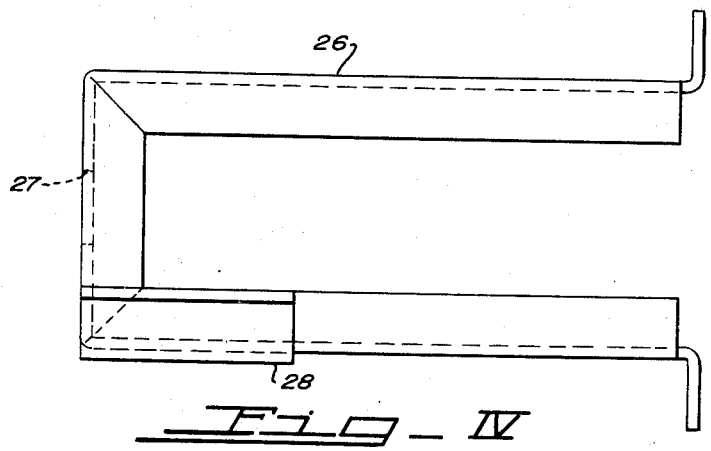
Fig. IV
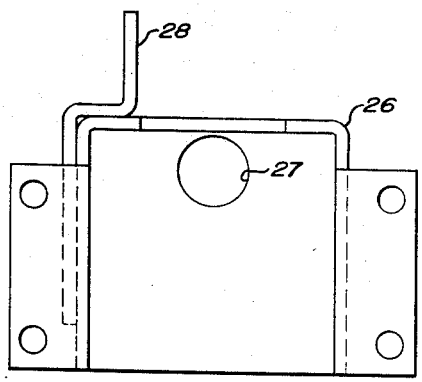
Fig. V
INVENTOR.
ARTHUR W. HAAS
BY
Marshall, Marshall & Yeasting
ATTORNEYS

United States Patent Office 2,776,046
Patented Jan. 1, 1957

2,776,046
CHAIN TENSIONING DEVICE FOR CONVEYOR DISHWASHING MACHINES

Arthur W. Haas, Rochester, N. Y., assignor to Toledo Scale Company, Toledo, Ohio, a corporation of New Jersey Application November 24, 1954, Serial No. 470,991

4 Claims. (Cl. 198—208)

This invention relates to conveyor type dishwashing machines, and more particularly to a combination chain tensioning device and guard for such machines.

The principal object of this invention is to provide an adjustably and flexibly mounted chain tensioning retainer for individually mounting each idler sprocket in a conveyor type dishwashing machine, whereby the tension of a chain cooperating with an idler sprocket may be individually adjusted and whereby the sprocket may be self-aligning with its chain, and to provide a guard cooperating with the chain tensioning retainer to limit movement of the retainer in all directions except in a direction generally parallel to the length of the chain. More specific objects and advantages are apparent from the following description, in which reference is had to the accompanying drawings illustrating a preferred embodiment of the invention.

Figure I of the drawings is a perspective view of the interior of a conveyor type dishwashing machine, parts being broken away, showing a pair of conveyor chains cooperating with idler sprockets in the far end of the machine, the idler sprockets being adjustably and flexibly mounted according to the invention.

Figure II is an enlarged plan view of the interior of the dishwashing machine shown in Figure I, parts being broken away and the conveyor chains and other adjuncts being omitted.

Figure III is an enlarged plan view of one of the idler sprockets shown in Figure II and a chain tensioning retainer for individually mounting the sprocket.

Figure IV is an enlarged plan view of one of the guard members of generally U-shape shown in Figure II.

Figure V is an end elevational view of the guard member shown in Figure IV.

These specific drawings and the specific description that follows merely disclose and illustrate the invention, and are not intended to impose limitations upon the claims.

A conveyor dishwashing machine including a combination chain tensioning device and guard therefor embodying the present invention comprises a frame, at least one bracket fixed to one end of the frame, at least one guard fixed to the other end of the frame and located opposite to the bracket, a track extending between the bracket and the guard, a drive sprocket rotatably mounted in the bracket, a chain tensioning retainer adjustably mounted on the frame for movement toward and away from the drive sprocket, a pin on the retainer cooperating with the guard, whereby movement of the retainer in directions other than toward or away from the drive sprocket is limited, an idler sprocket rotatably mounted in the retainer, and a continuous chain extending between the sprockets for conveying racks of dishes through the machine, a bottom of the chain resting upon the track.

Referring to Figure I, a dishwashing machine frame 1 encloses a washing space 2, a rinsing space 3 and supports a wash tank 4 and a rinse tank 5 below the respective spaces. The wash tank 4 normally contains washing liquid which is sprayed through wash tubes 6, the lower group of which is shown, mounted in and communicating with wash manifolds 7, the lower one of which is shown. A plurality of the wash tubes 6 are located at both the bottom and the top of the washing space 2 in the usual manner and washing liquid is sprayed up onto and down upon dishes carried in racks moved through the dishwashing machine by means of a pair of continuous conveyor chains 8. Washing liquid in the wash tank 4 is recirculated through a pump intake in a suction pipe leading to a conventional pump (not shown) which forces washing liquid under pressure through the wash tubes 6.

The rinse tank 5 normally contains hot rinsing liquid which is sprayed through rinse tubes 9, the lower group of which is shown, mounted in and communicating with rinse manifolds 10, the lower one of which is shown. A plurality of the rinse tubes 9 are located at both the bottom and the top of the rinsing space in the usual manner and rinsing liquid is sprayed up onto and down upon dishes carried in the racks moved through the dishwashing machine by means of the conveyor chains 8. Rinsing liquid in the rinse tank 5 is recirculated through a pump intake in a suction pipe leading to a conventional pump (not shown) which forces rinsing liquid under pressure through the rinse tubes 9.

The washed and rinsed dishes, before leaving the rinsing space 3 pass through a final or sanitizing rinse in the form of a solid cone spray. The sanitizing rinsing liquid is supplied from a source outside of the machine through final rinse spray lines 11, the lower one of which is shown, located at both the bottom and the top of the rinsing space 3. The sanitizing rinsing liquid is emitted from spray nozzles 12, the lower group of which is shown, and is captured after use in the rinse tank 5 to be recirculated as hereinbefore described.

Each of the continuous conveyor chains 8 extends between a drive sprocket 13 rotatably mounted at one end of the frame 1 and an idler sprocket 14 rotatably mounted at the other end of the frame 1, there being a pair of drive sprockets 13 and a corresponding pair of idler sprockets 14, as best shown in Figure II. The drive sprockets 13 are supported by brackets 15 fixed to the frame 1 and are rigidly interconnected by means of a drive shaft 16. The shaft 16 turns within bearings 17 welded one on each side of the brackets 15 and within a bearing tube 18 extending from one of the bearings 17 through the frame 1. A conventional gear reduction unit (not shown) for reducing motor speeds is operatively connected to the end 19 of the shaft 16 which protrudes through the frame 1 and turns the shaft 16 at selected speeds.

The idler sprockets 14 are individually and rotatably mounted in chain tensioning retainers 20 adjustably and flexibly mounted on the frame 1. The retainers 20 each have a stud 21 fixed on one of their ends, which studs 21 protrude through holes in the frame 1. The holes in the frame 1 are sealed against escape of washing liquid by means of flanged packing boxes 22 which squeeze washers 23 between the flanges on the boxes 22 and the frame and around the holes. The packing boxes 22 loosely surround the studs 21 and have extended portions protruding through the holes in the frame. The outer surfaces of the extended portions of the packing boxes 22 are threaded and packing nuts 24 are threaded thereon to hold the packing boxes in place. The inner surfaces of the packing boxes 22 are not threaded and the studs 21 are thus free to move within the boxes which loosely surround the studs. The movement of the studs 21 may be in all directions, i. e., the studs are free to move back and forth and the ends of the studs flexibly may move slightly radially and rockingly by using the packing boxes 22 as pivot and rocking points. Adjusting nuts 25 threaded on the ends of the studs 21 and turned against the ends of the packing boxes 22 hold the studs in adjustable position on the frame 1, i. e., the studs may be adjustably moved toward and away from the drive sprockets 13 when the adjusting nuts 25 are loosened.

The individual mounting of the idler sprockets 14 provides for individual adjustment of each of the chains 8. The adjustable mounting of the idler sprockets 14 provides a means for adjusting the tension of the chains 8 to take up slack and thus eliminates loose chains and gives positive conveyor action. The flexible mounting of the idler sprockets 14 allows the sprockets to be self-aligning with their respective chains 8.

Guards or members 26 of generally U-shape each having an opening 27 in the bottom of the U-shape are fixed to the frame 1, there being one guard 26 located opposite to each one of the brackets 15. Z-shaped fixtures 28 are attached one to each of the brackets 15 and one to each of the guards 26 and provide means for attaching tracks 29 to the brackets and to the guards. As shown in Figure I, a track 29, L-shaped in cross section and extending parallel to the sides of the frame 1, is provided for each of the chains 8, a bottom of each of the chains 8 resting upon its track. The flexibly mounted, chain tensioning retainers 20 are independent of the guards 26 permitting the idler sprockets 14 rotatably mounted in the retainers to be self-aligning with their respective chains 8.

Since the chain tensioning retainers 20 are independent of the guards 26, the only supports for the retainers are the studs 21. To prevent damage to the studs 21 by bending if an object is accidently dropped onto the retainers 20 or from the weight of the chains 8 when the chains are not partially supported by the drive sprockets 13 and by the tracks 29 during construction or repair of the dishwashing machine, pins 30 fixed one on each retainer 20 protrude through the cooperating openings 27 in the guards 26. The openings 27 in the guards are large enough to permit a small amount of radial and rocking movement of the pins 30, but limit any substantial movement of the pins in directions other than toward and away from the drive sprockets 13, i. e., in a direction along the axes of the pins. The guards 26 thus have two functions, one to provide supports for the tracks 29 and the other to provide means for limiting radial and rocking movement of the chain tensioning retainers 20 without hindrance to movement of the retainers in directions generally toward and away from the drive sprockets 13.

Various modifications may be made in specific details of construction without departing from the spirit and scope of the invention.

Having described the invention, I claim:

1. In a conveyor dishwashing machine, in combination, a frame, a drive sprocket mounted for rotation at one end of the frame, a chain tensioning retainer adjustably mounted on the other end of the frame opposite to the drive sprocket for movement toward and away from the drive sprocket, a guard that is fixed to the frame adjacent to the retainer and that cooperates with the retainer so that movement of the retainer in directions other than toward or away from the drive sprocket is limited to prevent damage to the retainer by bending, an idler sprocket rotatably mounted in the retainer, and a continuous chain extending between the sprocket for conveying racks of dishes through the machine.

2. A conveyor dishwashing machine according to claim 1 wherein said chain tensioning retainer is both adjustably and flexibly mounted on the frame.

3. In a conveyor dishwashing machine, in combination, a frame, a bracket fixed to one end of the frame, a drive sprocket mounted for rotation in the bracket, a packing box that is mounted on the other end of the frame opposite to the bracket and that has a portion extending through the frame, a chain tensioning retainer, a stud that is fixed to the retainer and that extends in a loose fit through the packing box, an adjusting nut threaded on the end of the stud against the packing box to hold the stud and thus the chain tensioning retainer fixed thereto in adjustable position on the frame, a guard that is fixed to the frame adjacent to the retainer and that cooperates with the retainer so that movement of the retainer in directions other than toward or away from the drive sprocket is limited to prevent damage to the stud by bending, an idler sprocket rotatably mounted in the retainer, and a continuous chain extending between the sprockets for conveying racks of dishes through the machine, said packing box functioning to prevent escape of liquid from the machine around the stud and to provide pivot and rocking points for the stud whereby the stud flexibly may move slightly radially and rockingly and thus permit the idler sprocket to be self-aligning with the chain.

4. In a conveyor dishwashing machine, in combination, a frame, a bracket fixed to one end of the frame, a drive sprocket mounted for rotation in the bracket, a packing box that is mounted on the other end of the frame opposite to the bracket and that has a portion extending through the frame, a chain tensioning retainer, a stud that is fixed to the retainer and that extends in a loose fit through the packing box, an adjusting nut threaded on the end of the stud against the packing box to hold the stud and thus the chain tensioning retainer fixed thereto in adjustable position on the frame, a guard fixed to the frame adjacent to the retainer, a track extending between the bracket and the guard, there being an opening in the guard, a pin fixed to the retainer remote from the stud, said pin extending through said opening in the guard whereby movement of the retainer in directions other than toward or away from the drive sprocket is limited to prevent damage to the stud by bending, an idler sprocket rotatably mounted in the retainer, and a continuous chain extending between the sprockets for conveying racks of dishes through the machine, a bottom of the chain resting upon the track, said packing box functioning to prevent escape of liquid from the machine around the stud and to provide pivot and rocking points for the stud whereby the stud flexibly may move slightly radially and rockingly and thus permit the idler sprocket to be self-aligning with the chain.

References Cited in the file of this patent
UNITED STATES PATENTS
1,512,918   Forsgard _____ Oct. 28, 1924